United States Patent [19]

Kurita

[11] Patent Number: 4,842,733
[45] Date of Patent: Jun. 27, 1989

[54] FILTER PLATE OF FILTER PRESS

[75] Inventor: Tetsuya Kurita, Takarazuka, Japan

[73] Assignee: Kurita Machinery Manufacturing Company Ltd., Osaka, Japan

[21] Appl. No.: 53,910

[22] PCT Filed: Sep. 5, 1986

[86] PCT No.: PCT/JP86/00452

§ 371 Date: Apr. 8, 1987

§ 102(e) Date: Apr. 8, 1987

[87] PCT Pub. No.: WO87/01300

PCT Pub. Date: Mar. 12, 1987

[30] Foreign Application Priority Data

| Sep. 6, 1985 | [JP] | Japan | 60-198247 |
| Sep. 6, 1985 | [JP] | Japan | 60-198248 |
| Dec. 3, 1985 | [JP] | Japan | 60-272967 |
| Sep. 3, 1986 | [JP] | Japan | 61-208390 |

[51] Int. Cl.$^4$ ............................................. B01D 25/12
[52] U.S. Cl. ................................... 210/225; 210/227; 210/231; 100/115; 100/198; 100/199
[58] Field of Search ............ 210/224, 225, 227, 228, 210/229, 230, 231; 100/113, 114, 115, 198, 199

[56] References Cited

U.S. PATENT DOCUMENTS

| 2,845,181 | 7/1958 | Rathe et al. | 210/224 |
| 2,998,140 | 8/1961 | Hoffman et al. | 210/231 |
| 3,289,845 | 12/1966 | Weber | 210/231 |
| 3,347,383 | 10/1967 | Augerot | 210/231 X |
| 3,503,326 | 3/1970 | Juhasz et al. | 100/115 |
| 4,194,977 | 3/1980 | Kubota et al. | 210/231 |
| 4,491,519 | 1/1985 | Kurita | 210/225 |
| 4,608,164 | 8/1986 | Neu | 210/231 |

FOREIGN PATENT DOCUMENTS

| 2238323 | 2/1974 | Fed. Rep. of Germany . |
| 2621245 | 11/1977 | Fed. Rep. of Germany . |
| 1322618 | 2/1963 | France . |
| 85008 | 4/1965 | France . |
| 1401265 | 4/1965 | France . |
| 44-31036 | 12/1969 | Japan . |
| 52-139579 | 10/1977 | Japan . |
| 55-35048 | 8/1980 | Japan . |
| 57-58969 | 12/1982 | Japan . |
| 58-2409 | 1/1983 | Japan . |
| 59-130508 | 7/1984 | Japan . |
| 59-166807 | 11/1984 | Japan . |
| 61-163010 | 10/1986 | Japan . |
| 1035190 | 7/1966 | United Kingdom . |
| 1118383 | 7/1968 | United Kingdom . |
| 2154460 | 9/1985 | United Kingdom . |

Primary Examiner—W. Gary Jones
Attorney, Agent, or Firm—Wenderoth, Lind & Ponack

[57] ABSTRACT

The invention relates to an improvement of the construction of filter plates which are mounted on a filter press. The filter plates comprises a frame (1), a flat filtrate drainage guide member (3, 41, 52) disposed in the frame (1), and a supporting member (5, 5d, 40, 48, 53) for movably supporting the filtrate drainage guide member in the frame (1). The filtrate drainage guide member (3, 41, 52) can be prevented from being broken if filtration pressure applied to one face of the filtrate drainage guide member (3, 41, 52) of the filter plate (2) is much different from that applied to the other face of the filtrate drainage guide member (3, 41, 52) because the filtrate drainage guide member (3, 41, 52) is movably provided in the frame (1).

23 Claims, 14 Drawing Sheets

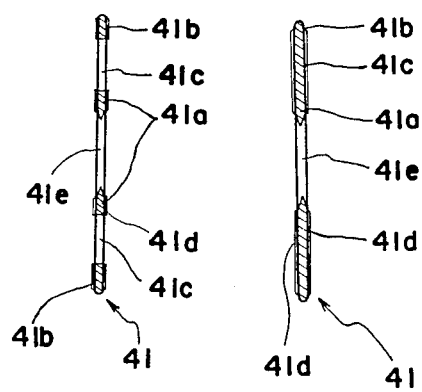
Fig. 14(II)  Fig. 14(III)

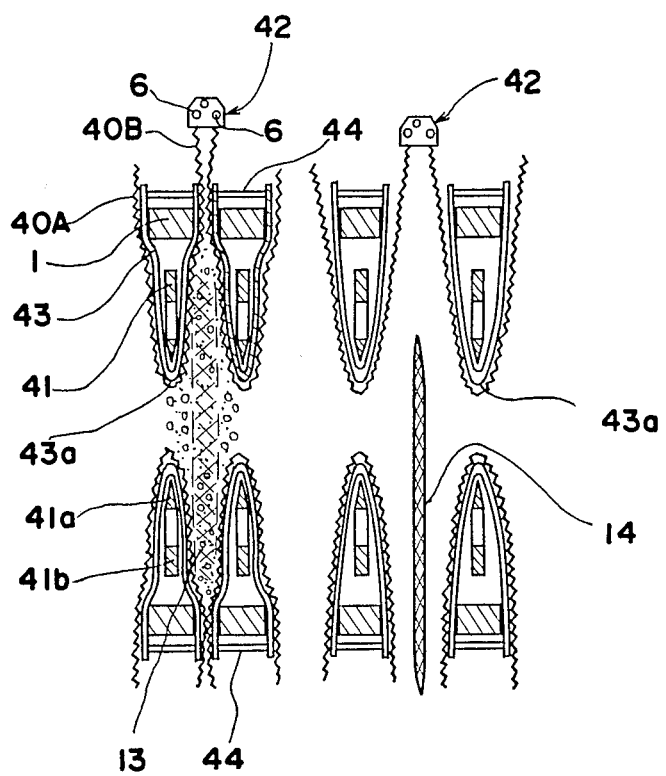
Fig. 16
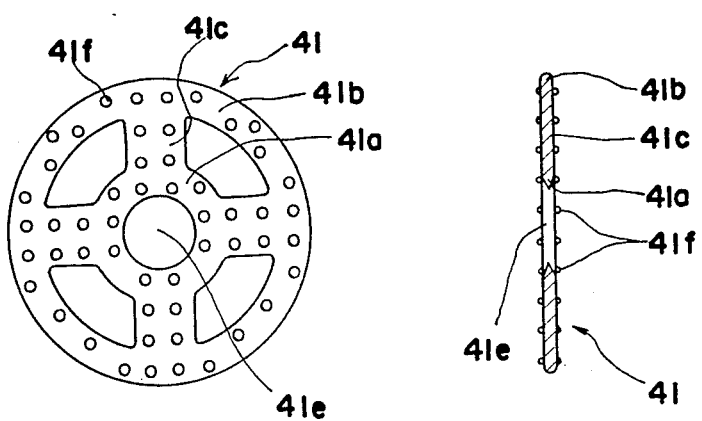
Fig. 17(I)
Fig. 17(II)

1 --- frame, 1a --- filtrate collecting hole, 1b --- ear, 1c --- communicating passage, 1d --- curved protrusion, 1e --- space, 2 --- filter plate, 3 --- filtrate drainage guide member, 4 --- gripping hand, 5, 27, 40, 48a, 53 --- filter cloth, 3a, 5a, 40a, 48b, 53a --- raw liquid feed hole, 5b --- communication piece, 5d --- supporting means, 6 --- cloth hanging bar, 7 --- arm, 8, 11 --- hinge, 9, 15 --- setscrew, 10, 21, 35 --- spring, 12 --- side beam, 13 --- filter chamber, 14 --- filter residue, 20 --- filter cloth hanging fixing member, 22 --- position adjusting bar, 23 --- stopper, 25 --- filter plate, 29 --- clamping means, 30 --- front stand, 31 --- rear stand, 32 --- rail, 33 --- filter cloth hanging member, 34 --- roller, 36 --- movable plate, 41 --- member for maintaining space between filter cloths as wall as vibrating filter cloths, 41a --- inner circular portion, 41b --- outer portion, 41c, 41m --- connecting member, 411 --- outer frame, 42 --- filter cloth hanging plate, 43 --- diaphragm, 44, 54, 57 --- bolt, 48 --- filter sheet, 49 --- law liquid feed plate, 50 --- setscrew, 52 --- filtrate collecting member, 55, 56 --- space maintaining member

FILTER PLATE OF FILTER PRESS

FIELD OF THE INVENTION

The present invention relates to a filter press, and more particularly, to an improvement of filter plates of the filter press.

BACKGROUND OF THE INVENTION

Filter plates of a filter press, having various structures are known in the art. A filter press shown in FIG. 35 is one of the known structures in which a filtrate drainage guide member 60b or a filtrate floor, for receiving a filtrate passing through a filter cloth and subsequently guiding it downwards, is formed in integration with a rectangular frame 60a and many recesses 60c, ..., 60c are formed on both faces of the filtrate drainage guide member 60b, whereby the filtrate which has passed through the filter cloth flows down smoothly.

According to the above-described structure, however, the filtrate drainage guide member is integrally fixed to the frame, and further, these members are all rigid bodies, so that when there arises a large difference in pressure between one face and the other face of each filter plate during a filtration process, the filtrate drainage guide member is liable to deform against the frame, which may lead to breakage of the filtrate drainage guide member.

It is an object of the present invention to provide a filter press in which a filtrate drainage guide member is prevented from being broken when pressure applied to one face of a filter plate is much different from that applied to the other face. In accordance with this construction, the above-described disadvantage can be solved.

SUMMARY OF THE INVENTION

In accomplishing these and other objects, according to the present invention, there is provided a filter press which is constructed such that a frame is formed separately from a filtrate drainage guide member; that is, a filter plate comprises a frame which forms a closed loop, a flat filtrate drainage guide means is disposed in the frame, and a support means for movably supporting the filtrate drainage guide means is provided in the frame.

The advantages obtained by this construction are as follows: Firstly, the above-described construction permits the filtrate drainage guide means to move in the frame independently or in unison with a filter cloth even if the pressure applied to one face of the drainage guide means is much different from the pressure applied to the other face, thereby eliminating fthe possibility of breakage of the filtrate drainage guide means.

Furthermore, the construction facilitates replacement of the filtrate drainage means against the frame. Still further, a replacement of a filtrate drainage guide means with a filtrate drainage guide means of a different thickness can vary the dimension of a filter chamber formed between the filtrate drainage guide means, a filter plate and a filtrate drainage guide means in a neighboring filter plate depending on the property of a raw liquid which is to be filtered, thus facilitating an adjustment of the percentage of water content contained in a filter residue. Still further, the configuration and width provided with a filtrate drainage guide means can be varied by replacing the filtrate drainage guide means with a filtrate drainage guide means of a different configuration and width depending on a property of a raw liquid which is to be filtered. Still further, a material which is used for the frame can be differentiated from that which is used for the filtrate drainage guide means, so that a highly rigid material can be selected for the frame, while the material for the filtrate drainage guide means can be most appropriately selected for a raw liquid which is to be filtered. Still further, light filter plates can be provided and accordingly the energy which is generated by a filter plate-driving unit can be reduced by using a material lighter than that which is used for the frame. Still further, since the frame and filtrate drainage guide means can be separated, it is easy to carry the filter plates, and the filter press can be operated by replacing only the filtrate drainage guide means if the filtrate drainage guide means is broken while the filter press is being assembled or a raw liquid is being filtered. Compared with this construction, replacement work in a conventional plate in which a frame body is integrated with a filtrate drainage guide means is troublesome; that is, when a filtrate drainage guide means or a frame is broken, it is necessary to replace an entire filter plate instead of replacing a broken part.

Furthermore, it is possible to vibrate only the filtrate drainage guide means because the filtrate drainage guide means is separately provided, so that the vibration of the filtrate drainage guide means cause vibration of the filter cloth, thus, sufficiently preventing filter residue from being clogged in the filter cloth.

BRIEF DESCRIPTION OF THE DRAWINGS

FIG. 16 is a sectional view of filter plates and filter cloths according to the first modification shown in FIG. 15, FIG. 17(I) is a front view of a member for maintaining space between filter cloths and vibrating filter cloths according to a modification of the second embodiment, FIG. 17(II) is a sectional view of the member for maintaining space between filter cloths and vibrating cloths shown in FIG. 17(I), FIGS. 18 and 19 are respectively, front views showing a member for maintaining space between filter cloths and vibrating cloths according to another modification.

DETAILED DESCRIPTION OF THE PREFERRED EMBODIMENT

The detailed description of the present invention is made with reference to the accompanying drawings shown in FIGS. 1 through 34.

FIGS. 1 through 11 show the first embodiment, FIGS. 12 through 25 show the second embodiment, and FIGS. 26 through 34 show the third embodiment according to the present invention.

Figure 1:
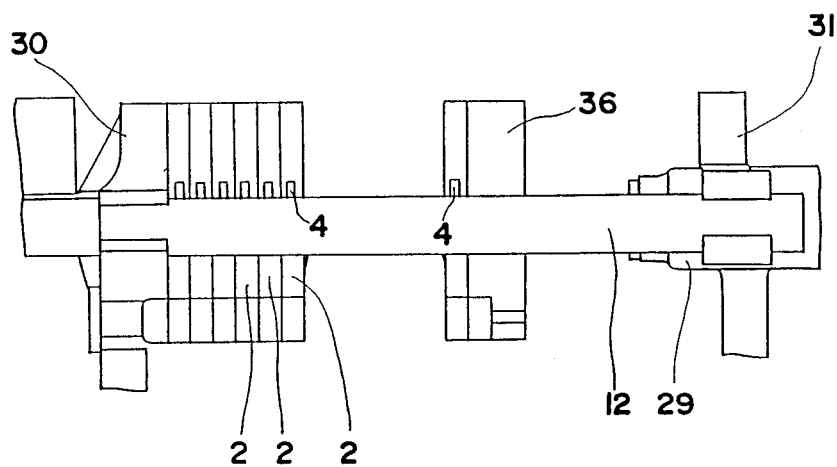
FIG. 1 is a schematic side elevational view showing the fundamental operation of a filter press according to a first embodiment of the present invention.

A filter press according to the present invention comprises, as shown in FIG. 1, side beams 12 and 12 provided between a front stand 30 and a rear stand 31; many filter plates 2, ..., 2 disposed between the front and rear stands 30 and 31 in such a way that the filter plates are slidably hung by the side beams 12 and 12 in the longitudinal direction thereof. Each of the filter plates comprises a frame 1 which forms a closed loop; flat filtrate drainage guide means 3, movably disposed in the frame 1; and supporting means 5, for movably supporting the filtrate drainage guide means 3, in the frame 1. A pair of filter cloths 5 and 5 are disposed between neighboring filter plates. A movable plate 36 is disposed between the rear stand 31 and the filter plate 2 positioned nearest the rear stand 31. The movable plate 36 is advanced toward the front stand 30 by a driving unit 29 on the rear stand 31 so that the filter plates 2, ..., 2 may be clamped to each other. Thereafter, a raw liquid is introduced, with pressure applied, into a filter chamber 13 for being filtrated. Then, the filtrate flows down through the filter cloth along the filter plate and filter residue is held between the pair of the filter cloths 5 and 5. After the filtration is completed, the movable plate 36 is moved back so as to space the filter plates 2, ..., 2 from each other.

Figure 2:
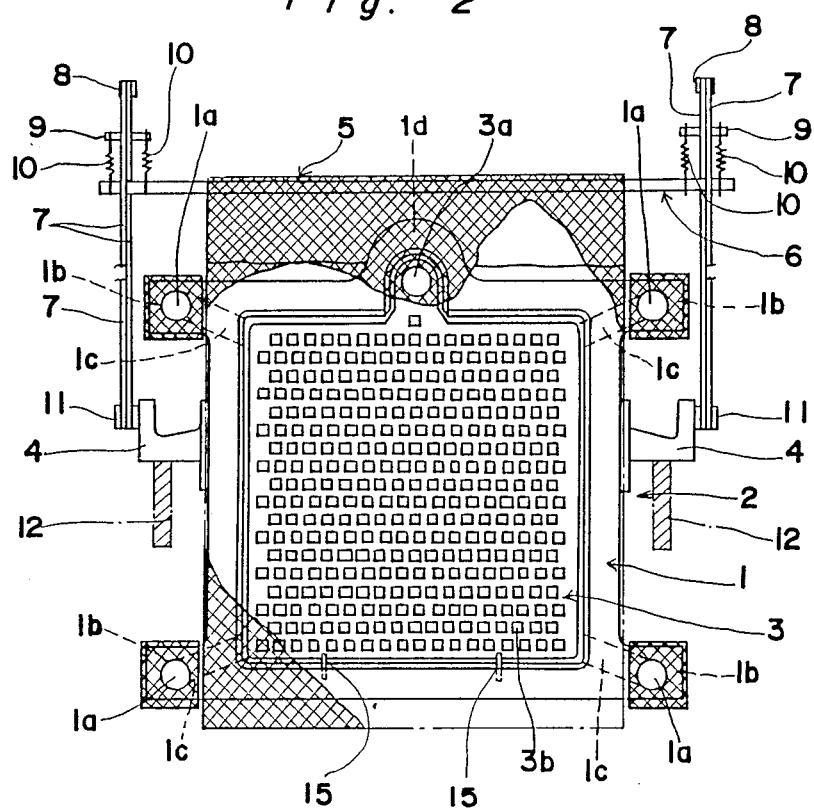
FIG. 2 is a front view showing a relationship between a filter plate and a filter cloth of a filter press according to the first embodiment.
Figure 3:
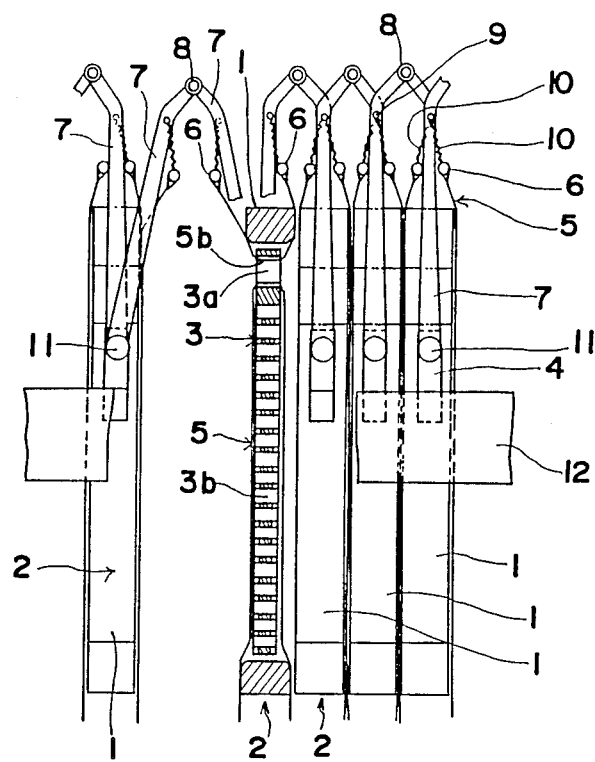
FIG. 3 is a partially sectional view showing a plurality of filter plates disposed in a filter press according to the first embodiment.

In the first embodiment, the supporting means is composed of the filter cloths 5 and 5 per se. Further, as shown in FIGS. 2 and 3, the pair of filter cloths 5 and 5 are interposed between the neighboring filter plates 2 and 2. Each of the filter plates 2 is approximately square and the periphery of the filter plate 2 is provided with the square frame 1. The frame 1 is provided with a filtrate drainage guide member 3 as the above-described filtrate drainage guide means separately formed therein. The filter cloth 5 is used as the supporting means.

The frame 1 of the filter plate 2 is composed of a metal, a synthetic resin or wood, forms a closed rectangular loop and is provided with ears 1b at both sides of the upper and lower portions thereof. Each ear 1b has a filtrate collecting hole 1a which passes therethrough and a communicating passage 1c which connects the filtrate collecting hole 1a to the surface of the filtrate drainage guide member 3. The frame 1 is provided with gripping hands 4 at both sides thereof at the middle in the vertical direction, and a curved protrusion 1d is formed at the middle of the upper portion thereof. Sliding of the gripping hands 4 on a side beam 12 moves the filter plate 2 along the side beam 12. The lower end portions of a pair of arms 7 and 7 are pivotally connected to the respective gripping hands 4 at the end faces thereof by hinges 11. The upper portion of each arm 7 is pivotally connected by a hinge 8 to the upper portion of an adjacent arm 7 pivotally connected to the gripping hand 4 of a neighboring filter plate 2, whereby the space between a pair of filter cloths 5 and 5 sandwiched between the filter plates 2 and 2 can be increased when the filter plates are spaced from each other and a filter residue 14 held between the filter cloths 5 and 5 can be dropped.

The filtrate drainage guide member 3 of the filter plate 2 is composed of metal such as aluminum, iron, synthetic resin such as polypropylene, nylon, polystyrene or wood. The member 3 is a square plate which has a thickness of 1 to 5/1 of that of the frame 1. The contour of the member 3 is almost equal to that of the frame 1. There may be a slight clearance between the contour of the member 3 and an inner periphery of the frame 1. The member 3 is provided with a plurality of filter passages comprising throughholes 3b, ..., 3b and the curved protrusion 1d at the upper portion thereof is provided with a raw liquid feed hole 3a which is penetrated therethrough.

Figure 4:
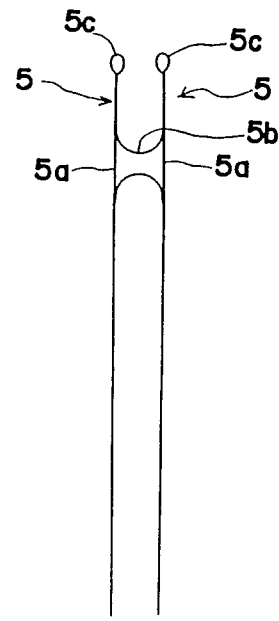
FIG. 4 is a schematic sectional view of the filter cloth shown in FIG. 2.
Figure 5:
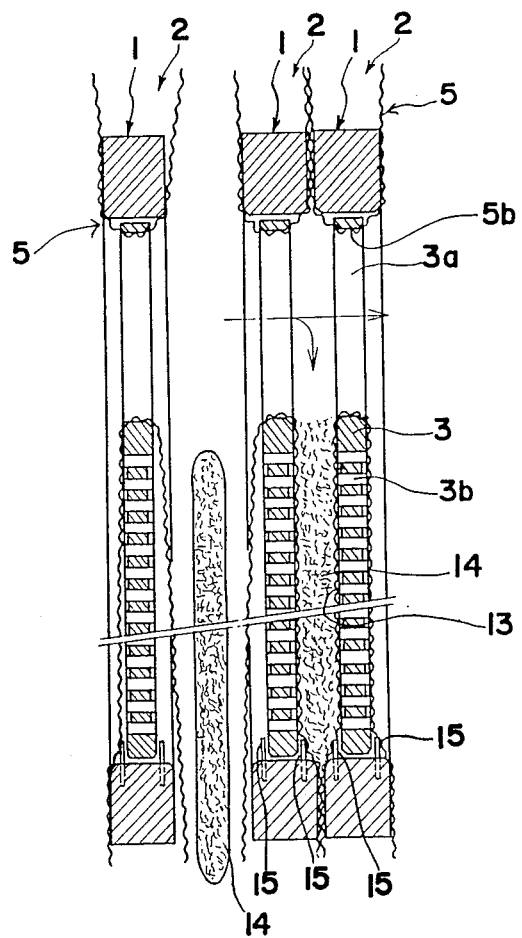
FIG. 5 is a side view showing three filter plates according to the first embodiment in which two filter plates located at the right side are closed and one filter plate at the left side is opened.

The construction of the filter cloths 5 and 5 is known in the art; that is, as shown in FIG. 4, the filters 5 and 5 are provided with raw liquid feed holes 5a and 5a at the respective upper portions thereof. The periphery of the raw liquid feed holes 5a and 5a are sewn with the periphery of cylindrical raw liquid feed communicating pieces 5b made of the same material as the filter cloth 5. Attached to the respective upper portions of the filter cloth 5 are pockets 5c and 5c which are formed by sewing the folded upper portions thereof. A filter cloth-hanging bar 6 is inserted through the pockets 5c and 5c. The respective cloth filter hanging bars 6 are hung so as to swing around pins 9, through springs 10 and 10 serving as a means for vibrating the filter cloths 5, whose both ends are penetrated into the respective upper portions of the pair of the arms 7 and 7. The cylindrical communicating piece 5b of the filter cloth 5 is penetrated into the raw liquid feed hole 3a of the filtrate drainage guide member 3 so that the cylindrical communication piece 5b functions as a connecting member, whereby the filtrate drainage guide member 3 is supported by being hung from the filter cloth 5 and is parallel to the filter cloth 5. The lower portion of the filtrate drainage guide member 3 is, as shown in FIG. 5, fixed by setscrews 15 and 15 detachably inserted into the lower portion of the frame 1 so that the lower portion of the member 3 may not be swayed perpendicularly to the surface of the frame 1.

In the press filter having the above-described construction, the respective filter plates 2 are assembled as follows. One of the pair of filter cloths 5 and 5 is first rolled up so as to penetrate it through the raw liquid feed hole 3a of the filtrate drainage guide member 3, and thereafter, it is unfolded so that both faces of the filtrate drainage guide member 3 are covered with the filter cloths 5 and 5 and the cylindrical communication piece 5b of the filter cloth 5 is positioned inside the raw liquid feed hole 3a of the filtrate drainage guide member 3. Thereafter, the filtrate drainage guide member 3 is hung by the filter cloths 5 and 5. Next, the frame 1 is supported by hanging it from a side beam 12 by means of the respective gripping hand 4, and then, one of the filter cloths 5 is penetrated through the frame 1. Thereafter, the filtrate drainage guide member 3 supported by hanging from the filter cloths 5 and 5 is fitted in the frame 1. Next, the lower portion of the filtrate drainage guide member 3 is fixed to the frame 1 by the setscrews 15 and 15 so that the member 3 is not shaken against the frame 1. The respective filter cloth hanging bar 6 is inserted into the respective pocket 5c of the respective filter cloth 5, and then, both ends of the respective filter cloth hanging bars 6 are supported by hanging them from arms 7 and 7 through the springs 10 and 10, with the result that the filter plate 2, in which the filtrate drainage guide member 3 is integrated with the frame 1, is assembled. Many filter plates thus formed are disposed inside the filter press. Thereafter, when the driving unit 29 is driven so that the movable plate 36 is advanced, and a pair of filter plates 2 and 2 at the right side in FIG. 5 are clamped to each other, a raw liquid is introduced from the respective raw liquid feed holes 3a into the filter chamber 13 formed between the pair of filter cloths 5 and 5 so as to filter the raw liquid in the filter chamber 13. The peripheral portions of the filter cloths 5 and 5 are sandwiched between the adjacent frames 1 and 1 and the filtrate drainage guide member 3 is connected to and supported by the filter cloths 5 and 5 located at the front and rear faces of the frame 1 through the cylindrical communicating piece 5b. Therefore, even if the filtrate guide member 3 is forced to move to one direction by the pressure of the raw liquid, the movement of the filtrate guide member 3 can be limited by the filter cloth 5. Thus, the movement of the filtrate drainage guide member 3 is very slight if any, so that the raw liquid is reliably filtered between the pair of the filter cloths 5 and 5 located between the neighboring filtrate drainage members 3 and 3. When the movable plate 36 is moved back by the driving unit 29 so as to unclamp the filter plates 2 as shown in FIG. 5 in which two filter plates 2 and 2 at the right side are spaced, the pair of arms 7 and 7 disposed at both sides of the frame 1 are opened so as to space the pair of cloths 5 and 5, so that the filter residue 14 sandwiched between the filter cloths 5 and 5 is dropped. When preparatory work for a filtration is performed, only the filtrate drainage guide member 3 is disassembled from the frame 1 and the filter cloths 5 and 5 as necessary, with the frame 1 supported by the side beams 12 and 12, so as to replace the disassembled filtrate drainage guide member 3 with a desired filtrate drainage guide member 3.

In the first embodiment, when the dimension of the filter chamber 13, formed between the filtrate drainage guide members 3 mounted on the filter plates 2 and 2 which are adjacent to each other, is changed depending on the property of a liquid which is to be filtered, the setscrews 15 and 15 are taken out of the frame 1 while the frame 1 is secured to the filter press, and then, the filtrate drainage guide member 3 is disassembled from the frame 1, and subsequently another filtrate drainage guide member 3, different in its thickness from that of the disassembled filtrate drainage guide member 3, is fitted in the frame body 1, and then, it is secured to the frame 1 by the setscrews 15 and 15, whereby the dimension of the filter chamber 13 is easily changed. Hence, a filtrate drainage guide member 3 is easily replaced. When it is desired to change the configuration or width of a filtrate flow passage groove; i.e., holes, 3b, ..., 3b depending on the property of a filtrate, a filtrate drainage guide member 3 having a different configuration or width in its filtrate flow passage groove is fitted in the frame 1, and then, the filtrate drainage guide member 3 is attached to the frame 1 by the setscrews 15 and 15. The material for the frame 1 may be different from that of the filtrate drainage guide member 3, e.g., a highly rigid material can be used for the frame 1 and a material most suitable for the filtrate drainage guide member 3 can be selected depending on the property of a raw liquid. When the filtrate drainage guide member 3 is formed using a material lighter than that for the frame 1, the filter plates are light as a whole, in which case, the driving power for driving the filter plates 2 can be reduced. Further, the filtrate drainage guide member 3 can be disassembled from the frame 1, so that it is easy to transport the filter plates 2. Furthermore, if the filtrate drainage guide member 3 is broken, a repair operation can be done by replacing only the broken filtrate drainage guide member 3. Since the filtrate drainage guide member 3 is supported by the pair of filter cloths 5 and 5 forward and rearward of the filtrate drainage guide member 3, it is difficult for the filtrate drainage guide member 3 to move in the direction perpendicular to the frame 1 even if a great force is applied to one of both faces of the filtrate drainage guide member 3, so that a raw liquid can be reliably filtered by the pair of the filter cloths 5 and 5 disposed between the adjacent filtrate drainage guide members 3 and 3. The filtrate drainage guide member 3 is not directly supported by the frame 1, therefore, it is unnecessary to mount a member for supporting the filtrate drainage guide 3 member on the frame 1 and the same filtrate drainage guide 3 member can be used by fitting it in the frame 1. Thus, the filtrate drainage guide means 3 can be utilized for various frame bodies.

Figure 6:
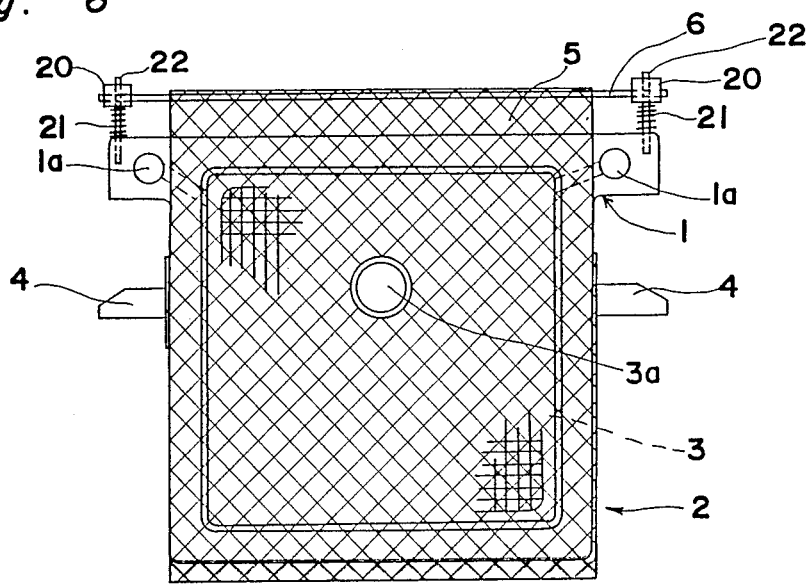
FIGS. 6 and 7 are, respectively, a front view and sectioned side elevational view showing a relationship between a filter plate and a filter cloth according to a modification of the first embodiment.
Figure 7:
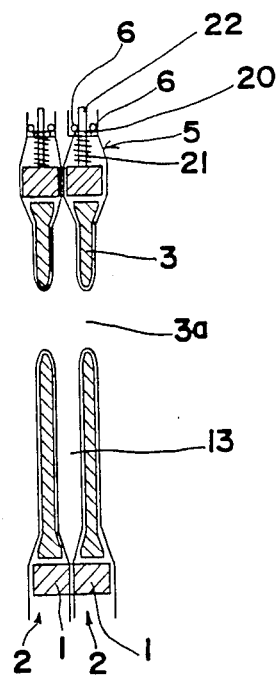

The construction of an apparatus according to the present invention is not limited to the above-described first embodiment, but may be embodied in various manners. For example, as shown in FIGS. 6 and 7, the filter cloth-hanging bar 6 may be mounted on both ends of the upper portion of the frame 1 of the filter plate 2 instead of being mounted on the arms 7 connected to the gripping hands 4. In detail, position adjusting bars 22 are protruded on both ends of the upper portion of the frame 1 and the filter cloth-hanging bars 6 are secured to the position adjusting bars 22 through a filter cloth-hanging bar fixing member 20, and a spring 21, serving as a vibrating means, is mounted between the filter cloth hanging bar fixing member 20 and the top ends of the frame 1.

Figure 8:
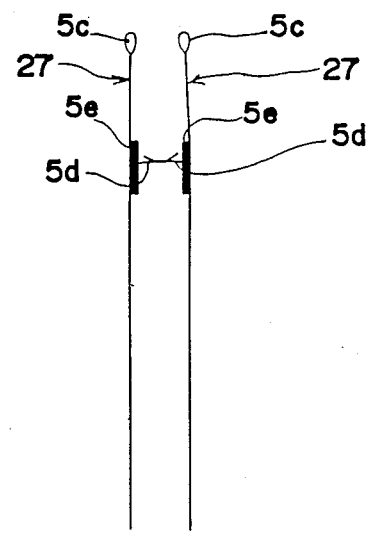
FIG. 8 is a schematic side elevational view of a filter cloth according to a second modification of the first embodiment.
Figure 9:
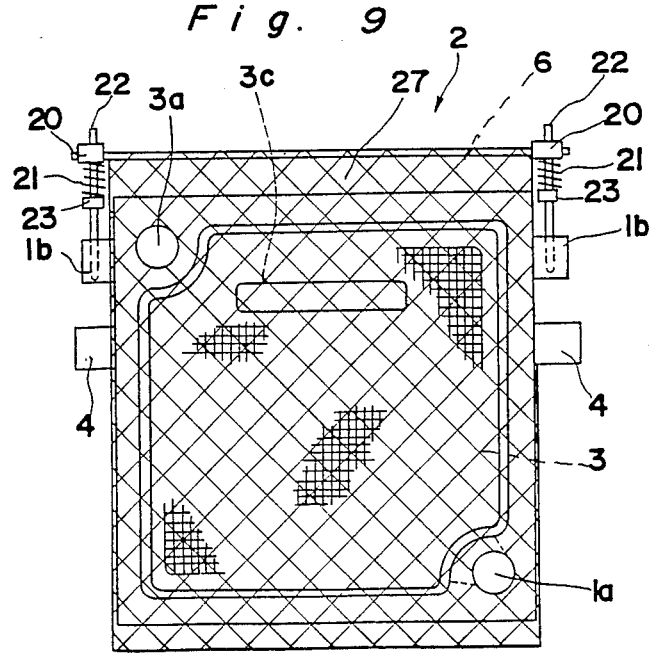
FIG. 9 is a front view of the second modification showing the relationship between a filter plate and a filter cloth.
Figure 10:
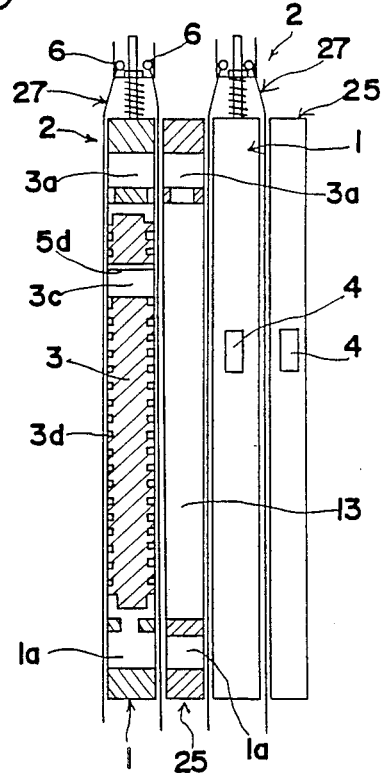
FIG. 10 is a side elevational view of filter plates and filter frames according to the second modification which are closed.

As shown in FIGS. 8, 9, and 10, cloths 5e and 5e are sewn with the corresponding filter cloths 27 and 27 at positions which confront with each other and a connecting member 5d such as a string and a narrow wire is connected to the cloths 5e so as to connect the cloths 5e and 5e. The frame 1 is provided with a raw liquid feed hole 3a at a corner thereof and a rectangular connecting-member inserting hole 3c is mounted on the filtrate drainage guide member 3 so as to penetrate thereinto and the connecting members 5d and 5d are inserted into the connecting-member inserting hole 3c so that the connecting members 5d and 5d are tied and the filtrate drainage guide member 3 is hung from the filter cloths 27 and 27. A filter press of a duplex type is constructed by disposing alternately the duplex filter plate 2 and a conventional filter plate 25. Numeral 23 in FIG. 9 shows a stopper for adjusting the force of the spring 21.

The configurations of the filtrate drainage guide member 3 and the frame 1 are selected as desired, for example, as circular configurations. The filtrate drainage guide member 3 may be so constructed that it has a through hole 3b or a convex-concave groove or honeycomb configuration. In order to prevent the filtrate drainage guide member 3 from being shaken against the frame 1, the filtrate drainage guide member 3 may be fitted in the frame 1. When pressure applied to filter plates is as high as 2 to 15 kg/cm² during a filtration process, tappets may be inserted between neighboring filtrate drainage guide members 3 and 3, in which case, the tappets abut with each other, so that the filtrate drainage guide member cannot be easily dislodged out of the frame 1. The cylindrical communicating piece 5b or the filter connecting member 5d may be penetrated into the through hole 3c formed in the filtrate drainage guide member 3 so as to hang the filtrate drainage guide member 3 from the filter cloth 5. The filtrate drainage guide member 3 may be provided with protrusions which are connected to the connecting member 5d so that the filtrate drainage guide member 3 can be hung from the filter cloths 5 and 5.

Figure 11:
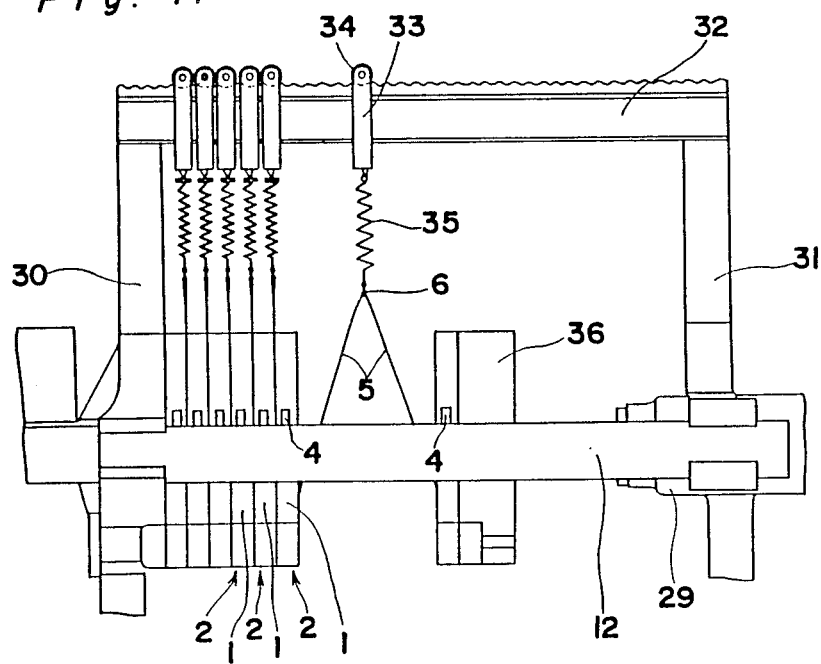
FIG. 11 is a side view of a filter press of a third modification of the first embodiment.

In the foregoing description, the filtrate drainage guide member 3 is supported by the frame 1 through the filter cloth 5 and the filter cloth-hanging bar 6, however, as shown in FIG. 11, the filtrate drainage guide member 3 may be supported by a supporting a member for supporting filter cloth-hanging member 33 movably supported on a rail 32 mounted on an upper portion between the front and rear stands 30 and 31. More specifically, the filter cloth-hanging bar 6 is supported by a spring 35 so as to swing the bar 6 around the spring 35 mounted on the supporting member 33 at the lower end thereof, whereby the member 33 for supporting filter cloth-hanging bar is moved along the rail 32 through a roller 34 in unison with movement of the frame 1 along the side beam 12. Thus, the filter plates 2 can move close to or apart from each other.

Figure 12:
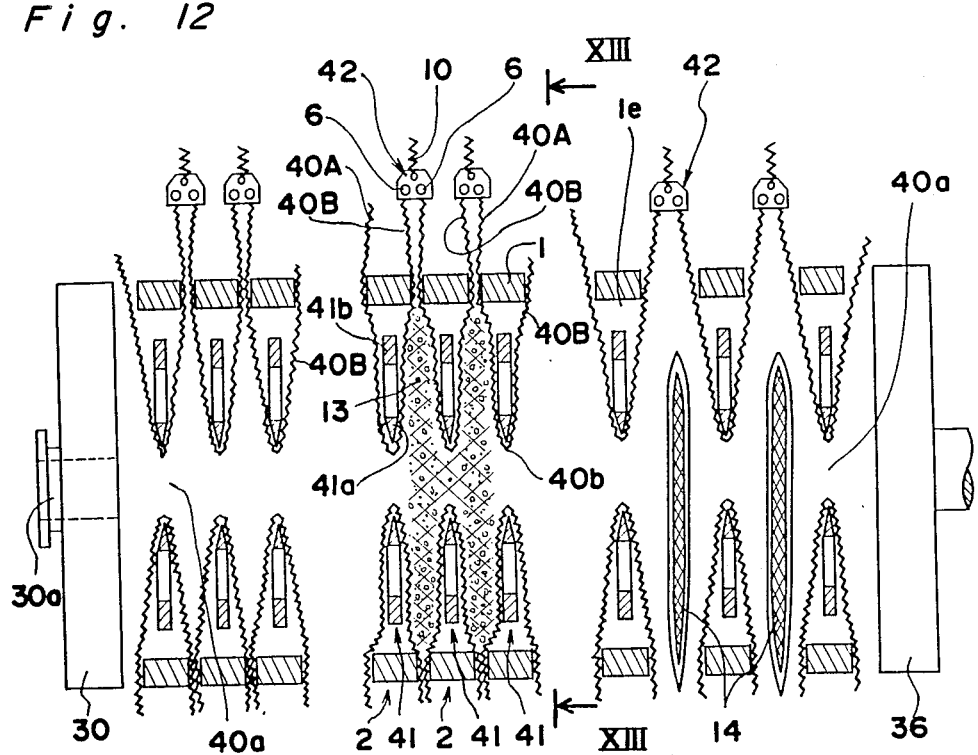
FIG. 12 is a schematic sectional view of an essential portion of a filter press according to a second embodiment of the present invention.
Figure 13:
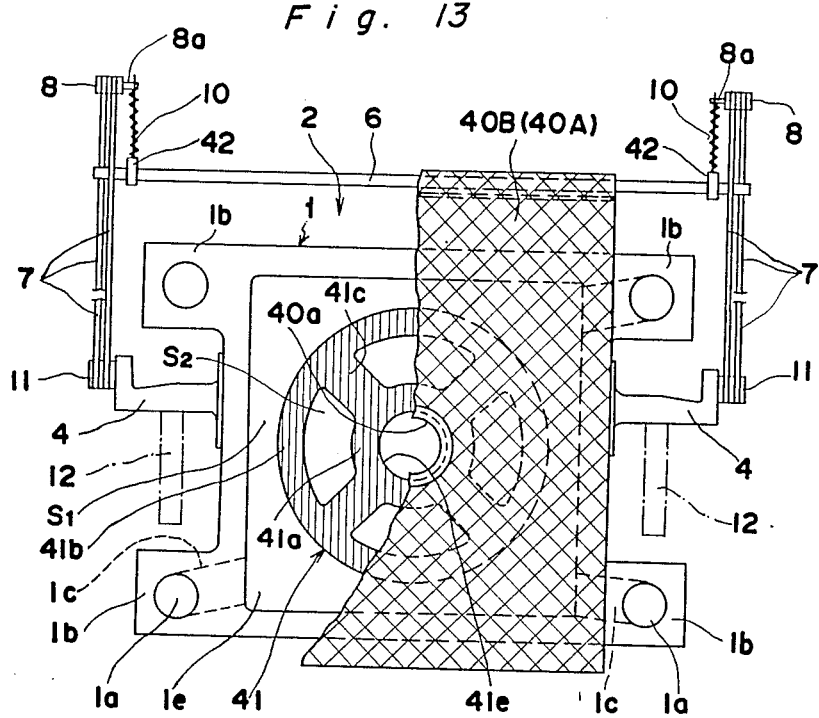
FIG. 13 is a view viewed in the direction of a line XIII—XIII in FIG. 12 in which the filter cloth is partially cut away.

A filter press according to a second embodiment comprises the filtrate drainage guide means serving, as a member for maintaining spaces between filter cloths as well as vibrating filter cloths, and filter cloths 40A and 40B serving as a supporting means. As shown in FIGS. 12 and 13, the filter plate 2 of the filter press comprises the square frame 1 from which sheet-shaped filter cloths 40A and 40B are hung at the front and rear faces of the filter press; a member 41; for maintaining space between filter cloths as well as vibrating filter cloths, which is to be inserted into the frame 1 and supported by the filter cloths 40A and 40B; and the filter cloth 40 which serves as a means for supporting the member 41 in the frame 1.

The filter cloth 40 is large enough to cover any of the front or rear face of the frame 1 and has a raw liquid feed hole 40a provided at the center thereof. The raw liquid feed hole 40a is located at approximately the center of a space 1e which is surrounded by the frame body 1. The filter cloths 40A and 40B hung from the frame at the front and rear faces thereof are connected to each other by sewing the circumference of the raw liquid feed openings 40a and 40a which confront each other. The member 41, for maintaining space between filter cloths as well as vibrating filter cloths is fixed to a raw liquid feed hole-connecting portion 40b fitting the portion 41 over the member 40b formed by sewing as mentioned above. The outer peripheries of the filter cloths 40A and 40B hung from the frame 1 which confront each other are sandwiched by the neighboring frames 1 and 1 and brought into close contact when the filter plates 2 and 2 are clamped, in which case, the filter chamber 13 is formed.

Since the construction of the frame 1 mounted on the filter plate 2 is approximately the same as the frame 1 of the first embodiment, the description of the same construction is omitted by designating like parts by like reference numerals and only the constructions different from the first embodiment are described herebelow. A spring supporting portion 8a is protrudingly formed, in the width direction of the filter press, from a hinge 8 mounted on an upper portion of each arm 7 of the frame 1 to connect the upper portion of the spring supporting portion 8a. A filter cloth hanging plate 42 is connected to a lower portion of a spring 10 attached at is upper end to the spring supporting portion 8a. The filter cloth hanging plate 42 has a pair of small holes which engage the ends of the filter cloth hanging bars 6 of the respective filter cloths 40. The filter cloths 40A and 40B at the front and rear faces of the neighboring frames are hung by means of the different hanging bars 6 and 6 supported on a respective hanging plate 42.

Figure 14I:
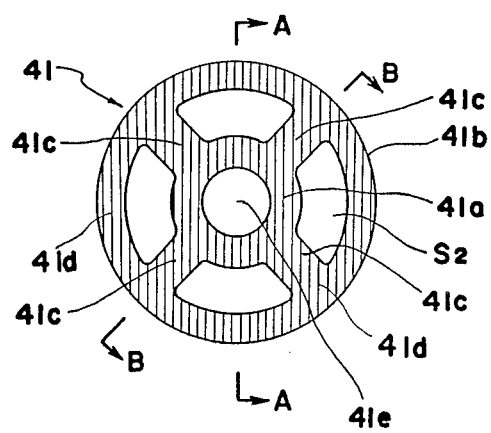
FIG. 14(I) is a front view of members for maintaining the space between filter cloths and vibrating filter cloths, FIG. 14(II) is a sectional view of the member taken along a line A—A in FIG. 14(I), FIG. 14(III) is a sectional view of the member taken along a line B—B in FIG. 14(I)

As shown in FIG. 14 (I) through (III), the member 41, for maintaining space between filter cloths as well as vibrating filter cloths mounted on the filter plate 2 is composed of an approximately circular thin plate in which an inner circular portion 41a and an outer portion 41b are integrally formed by connecting members 41c, . . . , 41c. The line which passes through the midpoints of the confronting portions S2 described later is at a right angle with the line which passes through the midpoints of the other confronting portions S2. Many ribs 41d, . . . , 41d are formed on the surface of the member 41. A hole 41e at the center of the inner circular portion 41a is so formed that its diameter is approximately the same as that of a raw liquid feed hole 40a of the filter cloths 40A and 40B, and the inner circular portion 41a thus formed is fitted over the portion 40b for connecting the raw liquid feed hole. More particularly, one of the filter cloths 40A and 40B is rolled up, and then, inserted into the hole 41e of the inner circular portion 41a. Thereafter, the member 41 is fitted over the connecting portion 40b located between the filter cloths 40A and 40B so as to hang the filter cloths 40A and 40B as described above, thereby supporting the member 41, for maintaining space between filter cloths as well as vibrating filter cloths, at approximately the center of the space 1e of the frame 1. As a result of supporting the member 41 on the filter cloths 40A and 40B, a space S1 is formed between the inner face of the frame 1 and the outer face of the outer circular portion 41b and space S2 is formed between the outer circular portion 41b and the inner circular portion 41a, in which case, the spaces S1 and S2 form the flow-out portion of filtrate, with the result that the member 41, for maintaining space between filter cloths as well as vibrating filter cloths supported in the frame 1 does not damage filtrate-drainage performance.

The filter plate 2, comprising the frame 1 and the member 41 for maintaining space between filter cloths as well as vibrating filter cloths, and the filter cloths 40 is disposed in the space 1e in the frame 1 as shown in FIG. 12; that is, the frame 1 is movably disposed between the front stand 30 and the movable plate 36. Next, a pair of filter cloths 40A and 40B are supported by means of the pair of arms 7, 7; 7, 7 through the spring 10 and 10, the filter cloth hanging plates 42 and 42, and the filter cloth-hanging bar 6. Then, the member 41, for maintaining space between filter cloths as well as vibrating filter cloths is fitted over the connecting portion 40b for connecting the raw liquid feed hole of the filter cloths 40A and 40B located at the front and rear faces of the frame 1. In FIG. 12, numeral 30a designates a pipe, for introducing raw liquid under pressure into the filter chambers 13 through the raw liquid feed hole 40a.

According to the above-described construction, the movable plate 36 is moved toward the front stand 30 so as to clamp the filter plates 2, . . . , 2 at a position near the front stand 30 (rear to FIG. 1). A raw liquid feed pump (not shown) is connected to the raw liquid introducing pipe 31a to feed a raw liquid under pressure to the respective filter chamber 13, and thereafter, the raw liquid under high pressure is introduced into each respective chamber 13 through the raw liquid feed hole 40a. As a result, the filter cloths, which are respectively sandwiched between adjacent frames 1, approach each other, however, the space therebetween is maintained by the number 41 for maintaining space between filter cloths as well as vibrating filter cloths the member 41 being interposed between the filter cloths 40A and 40B. By virtue of this construction, the filtrate flows out of the filter chamber 13 and passes through the filter cloths 40A and 40B to the spaces S1 and S2 in the frame 1, and thereafter, flows down to the lower portion of the frame 1, and then flows through a communicating hole 1c into a filtrate collecting hole 1a. The filter residue 14 remains between the pair of cloths 40 and 40.

After a raw liquid is filtered, the movable plate 36 is moved back to space the filter plates 2, . . . , 2, with the result that the filter residue 14 drops through an outlet formed at the lower portions of the filter chamber 13. At this time, since the filter cloths 40A and 40B are supported by the springs 10, the filter cloths 40A and 40B are easily vibrated when the filter plates are away from each other since the filter cloths 40A and 40B are vibrated in contact with the member 41, so that the filter residue 14 which has adhered to the mesh of the filter cloths 40 is dropped.

The following advantages are obtained according to the above described second embodiment. The frame 1 is simple in its construction, namely, approximately square, so that a light filter press can be constructed and manufacturing cost is low. Since the space between the filter cloths 40A and 40B is maintained by the member 41 for maintaining space between filter cloths as well as vibrating filter cloths, contact of the filter cloths 40A and 40B can be prevented. Since the member 41 is supported by hanging from the filter cloths 40A and 40B, the filter residue 14 which has been clogged in the mesh of the filter cloth 40 can be dropped due to contact of the filter cloth 40 with the member 41, caused by vibration of the filter cloth 40, thus clogging of the filter residue in the filter cloth 40 can be prevented. The member 41 for maintaining space between filter cloths as well as vibrating filter cloths 40A and 40B can be easily directly mounted on the portion 40b for connecting the raw liquid feed hole mounted on the filter cloth 40. Therefore, it is easy to assemble a filter press and the assembly of the filter press requires very few parts. Furthermore, due to the provision of the member 41, the filtering performance of the filter cloths 40A and 40B are more preferable than the filtering performance obtained by the provision of a member for maintaining space between filter cloths.

Figure 15:
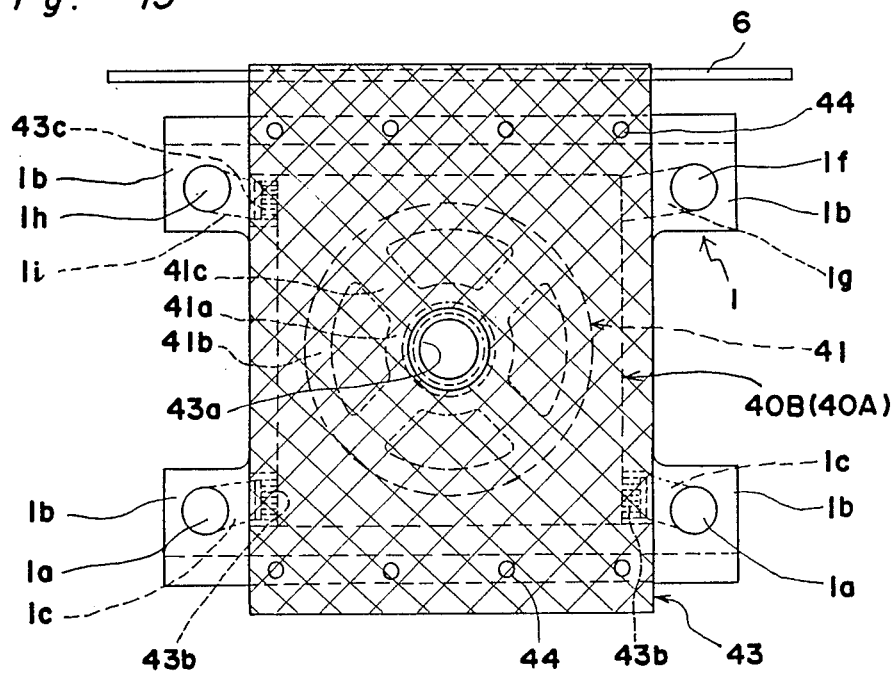
FIG. 15 is a front view of a first modification of the second embodiment in which a filter plate provided with a pressing diaphragm is covered with a filter cloth.

The second embodiment is not limited to the above-described construction. For example, the second embodiment can be preferably applied to a filter plate of a compressing type. As shown in FIGS. 15 and 16, pressing diaphragms 43, composed of an elastic material such as rubber, on which many irregularities are formed, are fitted on the inner sides of the filter cloths 40A and 40B which sandwich the frame 1 and the respective upper, and lower ends of a pair of the diaphragms 43 mounted at the front and rear sides of the frame 1 are easily fixed by bolts 44, . . . , 44; 44, . . . , 44. The respective raw liquid feed hole 43a of a pair of the diaphragms 43 and 43 are connected to each other, and the member 41 for maintaining space between filter cloths as well as vibrating filter cloths 40A and 40B is fitted over the connecting portions to support the raw liquid feed holes 43a. In FIG. 15, numeral 1f designates a fluid flow hole formed at the ear 1b mounted on the frame 1, whereby fluid which expands the compressing diaphragms 43 is introduced, with pressure applied, between the confronting compressing diaphragms 43 and 43 through a communicating hole 1g. Filtrate take-out holes 43b and 43b, formed in the diaphragm 43, connect the surface of the diaphragm to a communicating hole 1c. Numeral 1h indicating a cleaning fluid-flowing hole formed at the ear 1b disposed at the upper portion of the frame body 1 communicates a communicating hole 1i formed on the frame 1 to the communicating hole 43c formed in the diaphragm 43. After a raw liquid is filtered, cleaning fluid is ejected to the diaphragm surface and the underside of the filter cloths 40A and 40B through the fluid-flow hole 1h and the communicating holes 1i and 43c. In the above-described embodiment, the member 41 is for maintaining space between filter cloths as well as vibrating diaphragms 43 and 43, so that the diaphragms never contact with each other and compressing fluid is easily supplied. Further, the filter residue 14 is compressed by the compressing diaphragm 43 through the filter cloth 40, and the compressing diaphragm 43 serves as a means for vibrating the filter cloth 40 when the filter plates are spaced for filtrate drainage.

The member 41 for maintaining space between cloths as well as vibrating filter cloths 40A and 40B may be mounted between the filter cloths 40A and 40B and the compressing diaphragm 43 so that the member 41 may act directly on the filter cloth 40.

Figure 18:
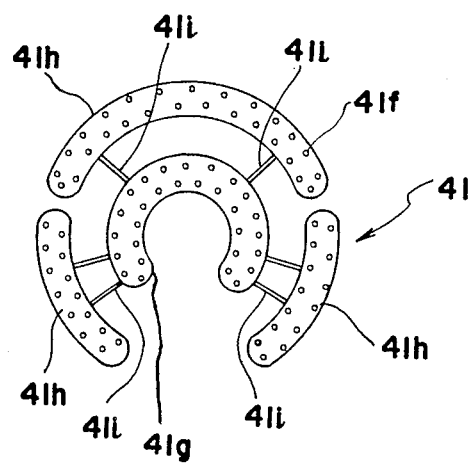
Figure 19:
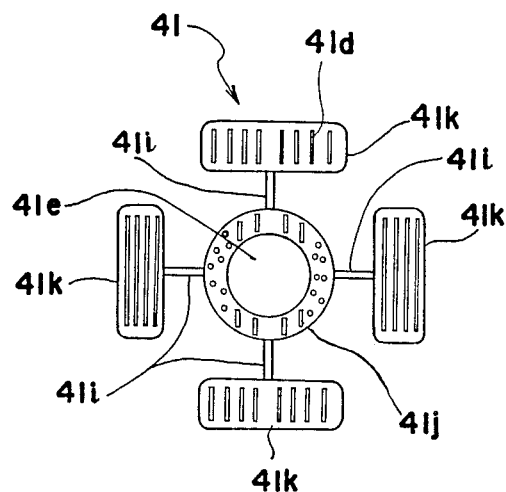

As shown in FIG. 17 (I) and (II), a plurality of protrusions 41f provided on opposite surfaces of the member 41 form a fluid guiding groove which guides the filtrate to facilitate flow. Further, the protrusions 41f can act as a rib, which reinforces the member 41. In addition, clogging of filter residue can be prevented due to vibration, transmitted from the filter cloth 40, caused by the contact of the protrusions 41f with the filter cloth 40. FIGS. 18 and 19 show modifications of the member 41. The member 41 shown in FIG. 18 is so constructed that the outer periphery of a supporting plate 41g in horseshoe shape is connected to outer plates 41h, 41h, and 41h by elastic pins 41i, ..., 41i. In the member 41 shown in FIG. 19, the outer periphery of a circular plate 41j is connected to outer plates 41k, 41k, and 41k by pins 41i, ..., 41i. The above-described members 41 can impart a tapping vibration to the filter cloth 40 at the back side thereof.

As a modificationn of the member 41, the member 41 may be mounted on a filter cloth through a raw liquid feed plate instead of hanging it from the filter cloths 40A and 40B. More specifically, as shown in FIGS. 20 and 21, the frame 1 is covered with a large filter sheet 48 so as to hang filtering portions, namely, filter cloths 48a and 48a from the frame 1 at the front and rear faces thereof and a raw liquid feed plate 49 is mounted on a raw liquid feed hole 48b and the member 41 is mounted on the raw liquid feed hole 48b of the filter plate 49.

Through holes 1k, 1k, 1m, 1m are mounted on the ears 1b, ... 1b disposed at the upper and lower portions of the frame 1. The respective through holes 1m provided at the lower portion of the frame 1 are communicated to one end of a communicating hole 1n provided at the lower portion thereof and the other end of the communicating hole 1n is communicated to a lower corner of a space 1e surrounded by the frame 1 so as to form a hole for ejecting cleaning liquid as well as releasing liquid and respective upper through holes 1k are communicated to an end of an upper communicating hole 1l and the other end of the communicating hole 1l is communicated to an upper corner of the space 1e of the frame 1 so as to form a hole for ejecting cleaning liquid as well as releasing liquid.

Figure 20:
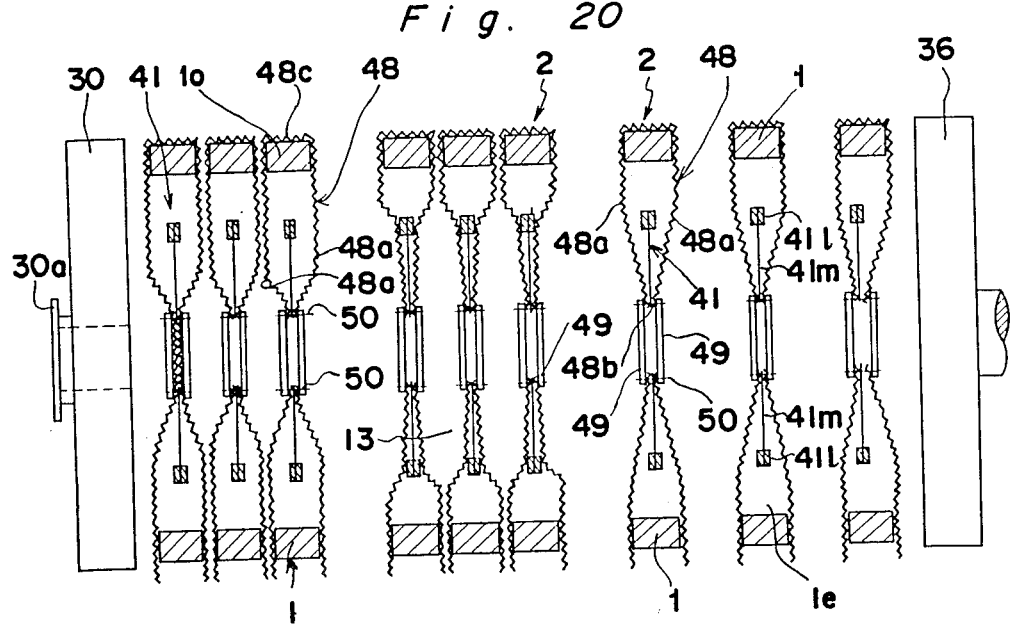
FIG. 20 is a schematic sectional view showing the essential portion of a filter press according to another modification of the second embodiment.

As shown in FIG. 20, the filter cloth sheet 48, which is long in the lateral direction thereof has raw liquid feed holes 48b and 48b at approximately the center of the filter cloths 48a and 48a hanging from both faces of the frame 1. The filter cloth 48 is hung from the frame 1 in such a manner that the top end face 48c of the filter sheet 48 strides over the upper face 1o of the frame 1 and covers the outer periphery of the frame 1 and the raw liquid feed holes 48b and 48b are positioned at approximately the center of the space 1e in the frame body 1.

Figure 21:
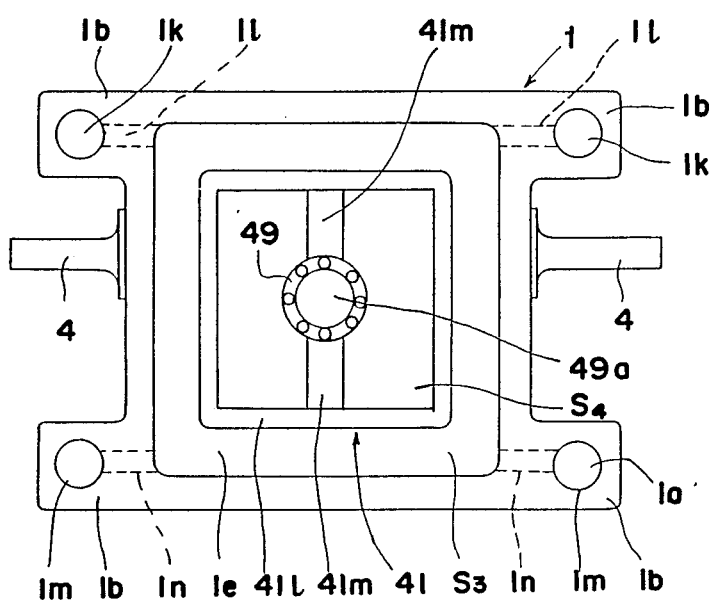
FIG. 21 is a front view showing a frame, a member for maintaining space between filter cloths and vibrating cloths, and a raw liquid feed plate shown in FIG. 20.
Figure 22:
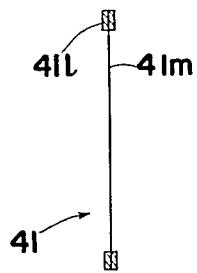
FIG. 22 is a cross-sectional view of the member for maintaining space between filter cloths and vibrating filter cloths shown in FIG. 21.

As shown in FIGS. 21 and 22, the member 41 comprises a portion 41l for maintaining space between filters which is composed of a rectangular thick frame, and a pair of thin spring-like diaphragms 41m and 41m whose both ends are connected to the middle of the upper and lower portions of the portion 41l so that the diaphragms 41m and 41m pass through the centers of the spaces surrounded by the portion 411. The members 41 are inserted into the filter cloths 48a and 48a positioned at the front and rear faces of the frame 1 and disposed in parallel with the filter cloths 48a. The confronting ends of the diaphragms 41m and 41m are disposed at the inner side of the raw liquid feed holes 48b and 48b and circular raw liquid feed plates 49 and 49 are brought into contact with the outer side of the raw liquid feed holes 48b and 48b. The raw liquid feed plates 49, the filter cloths 48a, and the diaphragms 48m are clamped by setscrews 50, ..., 50. Thus, the member 41 is fixed to the filter cloths 48a and 48a through the raw liquid feed plates 49 and 49 so as to be assembled to the frame 1.

In a filter press in which many filter plates 2 having such a construction as described above are assembled, a raw liquid under high pressure is filled in the respective filtering chamber 13 through the holes 49a of the respective raw liquid feed plates 49 when the raw liquid is fed to the raw liquid introducing tube 30a by the raw liquid feed pump (not shown). As a result, the filter cloths 48a and 48a sandwiching the frame 1 approach each other in the frame 1. However, space between the filter cloths 48a and 48a is maintained by the space maintaining portion 411 of the member 41 disposed at the center of the space 1e in the frame 1. According to this construction, raw liquid flows from the filtering chamber 13 through the filter cloths 48a and 48a disposed at both sides of the frame body 1, and flows into a space S3 formed between the inner periphery of the frame 1 and the outer periphery of the member 41 and the space S4 formed between the filter space-maintaining portion 411 and the raw liquid feed plate 49, and then, flows into the filtrate releasing holes 1n and 1n which are opened at corners of the lower portion of the inner periphery of the frame 1 and collected by the through holes 1m and 1m provided at the lower portion of the frame 1.

After a filtration process is completed, the frame 1 is moved so as to widen the space between frame 1 and 1, and thereafter, filter residue is released. Since the diaphragm 41m of the member 41 is composed of a resilient thin plate, the diaphragm 41m easily vibrates when the frame 1 is moved and the filter residue 1 is removed from the filter cloths 48a and 48a since the filter cloths 48a and 48a located at both sides of the frame 1 are vibrated and the filter cloths 48a and 48a abut the member 41, which causes the filter residue 14 which has stayed in the mesh of the filter cloths 48a and 48a to fall. Filter cloths are cleaned by introducing cleaning liquid into either a through hole disposed at an upper portion or at a lower portion of the frame and also into the space between the filter cloths 48a and 48a.

The following advantages are obtained according to the above-described modified construction. A filter press is light and manufacturing cost is low because the configuration of the frame is simple, namely, substantially rectangular. Since the space between the filter cloths 48a is maintained by the member 41, contact of the filter cloths 48a can be reliably prevented. Further, as the member 41 is provided with the flat spring or diaphragm 41m, the member 41 is easily vibrated. The filter residue 14 which has stayed in the mesh of the filter cloth 48a can be removed by vibrating the filter cloth 48a and bringing the member 41 into contact with the filter cloth 48a, whereby the residue 14 is prevented from being clogged in the mesh in the filter cloth 48a. Moreover, the member 41, which is inserted between the filter cloths 48a and 48a, and the raw liquid plates 49 and 49 can be integrated, thus facilitating an assembly operation.

Figure 23:
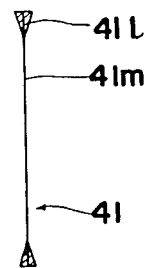
FIG. 23 is a sectional view showing another modification of the member for maintaining space between filter cloths and vibrating filter cloths.
Figure 24:
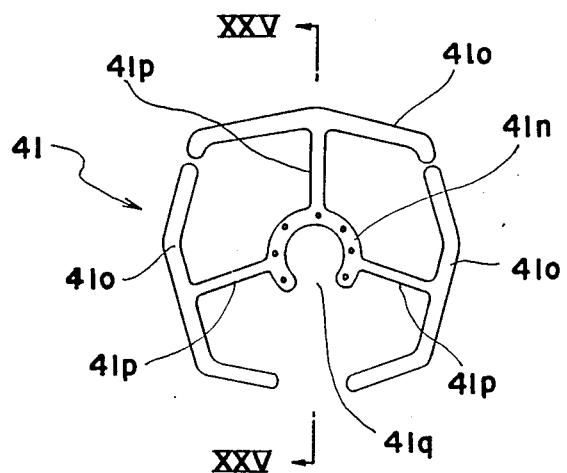
FIG. 24 is a top plan view showing a further modification of the member for maintaining space between filter cloths and vibrating filter cloths.
Figure 25:
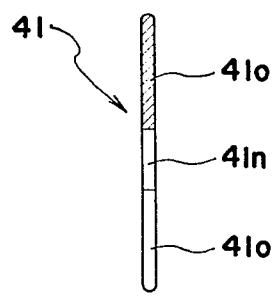
FIG. 25 is a sectional view of the modification taken along a line XXV—XXV in FIG. 24.

Another modification is shown in FIG. 23, i.e., the cross section of outer frame 411 of the member 41 may be so formed that the cross section thereof is triangular. The member 41 may be made of synthetic resin. In FIGS. 24 and 25, a raw liquid feed hole connecting portion 41n is U-shaped. Diaphragms 41o are respectively connected to the outer periphery of the raw liquid feed hole connecting portion 41n by means of the corresponding arms 41p so as to preferably flow raw liquid downwards. Further, a sufficiently wide space between neighboring filter cloths 48a and 48a can be provided by the raw liquid feed hole connecting portion 41n. Furthermore, the filter cloths 48a and 48a may be vibrated due to the vibration caused by the diaphragms 41o, . . . , 41o.

In the second embodiment, the raw liquid feed holes 40a, 48b provided at the filter cloths 40 and 48a are respectively, located at substantially the center of the frame 1. However, the holes 40a, 48b can also be applied to a filter press of a top feed type (refer to FIG. 2) in which a raw liquid feed hole is formed at an upper portion of the frame 1 as well as a filter press of a bottom feed type in which a raw liquid feed hole is formed at a lower portion of the frame 1. The method for supporting the filter cloths 40 and 48a by hanging them from the frame 1 is not limited to the above-described methods. The filter cloths 40 and 48a may be supported by a member other than the frame 1 as shown in FIG. 11. The frame 1 may be formed in any desired configuration such as circular, polygonal or the like.

Figure 26:
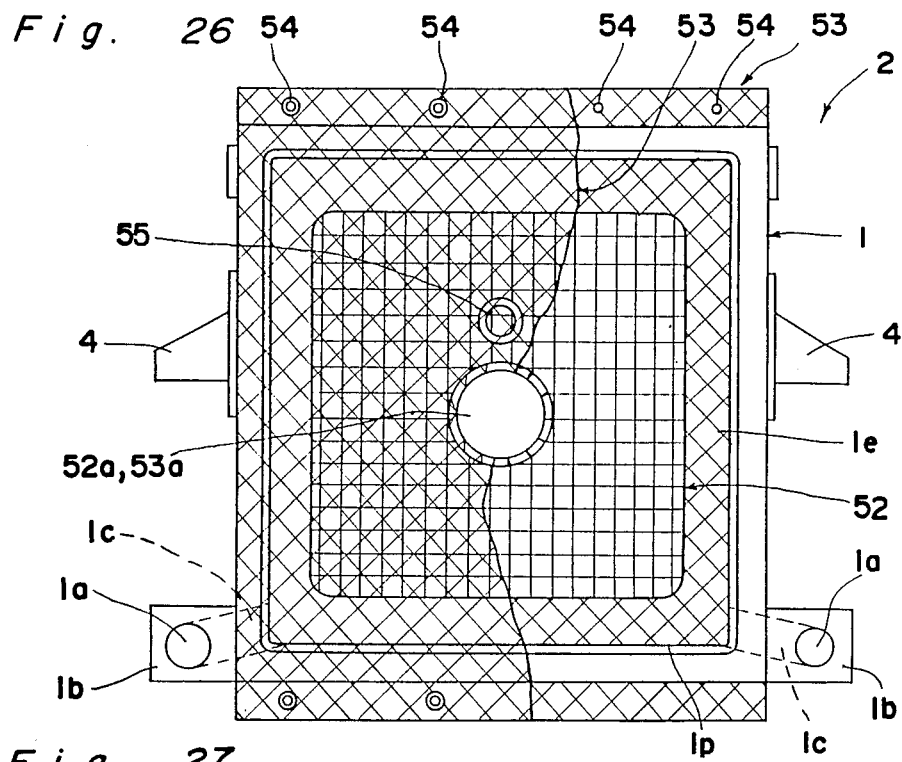
FIG. 26 is a partially broken away front view in which a filter plate of third embodiment of the present invention is covered with a filter cloth.
Figure 27:
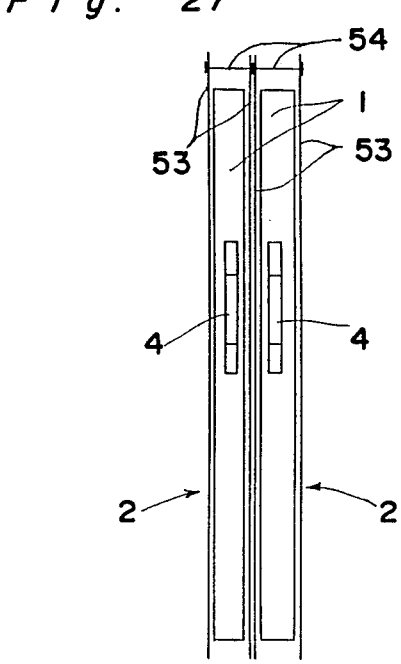
FIGS. 27 and 28 are a side elevational view and a sectional side elevational view of the two filter plates shown in FIG. 26.
Figure 28:
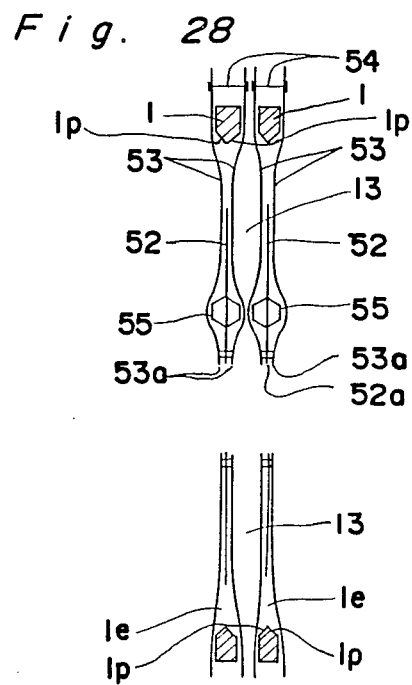

In a filter press in a third embodiment, the filtrate drainage guide means serves as a filtrate collecting member and a filter cloth 53 movably supported in the frame body 1 acts as the supporting means. More specifically, a filter plate 2 of a filter press in the third embodiment 3 is, as shown in FIGS. 26, 27, and 28, provided with a frame 1, a filtrate collecting member 52 disposed in the frame 1, and filter cloths 53 and 53, serving as the supporting means, disposed at both faces of the frame 1 so as to surround a space 1e in the frame 1 in the direction perpendicular to the front and back thereof. During a filtration process, a pair of filter cloths 53 and 53 are sandwiched between the neighboring frames 1 and 1, and raw liquid under pressure is introduced into the filtering chamber 13 between the filter cloths 53 and 53 so as to filter the raw liquid, and thereafter, a cake is maintained in the filtrating chamber 13 located between the filter cloths 53 and 53. Filtrate is stored in the space 1e in the respective frame 1 through filter cloths 53, and thereafter, the collected filtrate is allowed to flow through filtrate collecting member 52 to the lower portion of the frame 1 so as to be collected.

The configuration of the above-described frame 1 is pentagonal in its horizontal section and vertical section as shown in FIG. 28. The frame 1 has inclined inner faces 1p, 1p inclining from the middle toward both sides in the direction perpendicular to the front and back of the frame body 1. Ears 1b and 1b are formed at opposed lower portions of the side faces of the frame 1, and a filtrate collecting hole 1a, which penetrates in the direction perpendicular to the ears 1b and 1b, is formed at the ears 1b and 1b. A communicating hole 1c which communicates with the space 1e, formed inside the frame 1 to the filtrate collecting hole 1a, is formed at each corner at the lower portion of the frame 1.

The filter cloths 53 are disposed at both sides of the frame 1 so as to sandwich the space 1e formed inside the frame 1. The upper and lower portions of a pair of the filter cloths 53 and 53 are clamped by means of bolts 54 to be suppoted by the frame 1. Each of the filter cloths 53 has a circular raw liquid feed hole 53a located at a position corresponding to the center of the frame 1. The periphery of the raw liquid feed hole 53a of each of the filter cloths 53 and 53 are sewn together.

Figure 29:
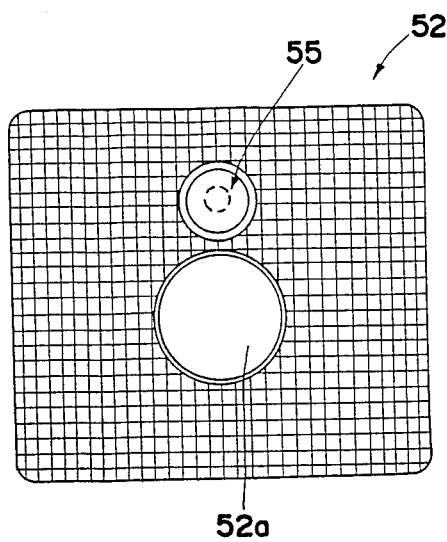
FIG. 29 is a front view of a filtrate collecting member provided with a space maintaining member shown in FIG. 26.

As shown in FIG. 29, the filtrate collecting member 52 made of cloth is disposed in the space 1e inside the frame 1. The front and rear faces of the member 52 are covered with the filter cloths 53 and 53, respectively. A through hole 52a which communicates with the raw liquid feed hole 53 formed on the filter cloth 53a is formed at the center of the filtrate collecting member 52. The peripheral edge of the through hole 52a is sewn with the peripheral end of the raw liquid feed hole 53a and the filtrate collecting member 52 is hung by the filter cloth 53 so as to move the raw liquid collecting member 52 freely together with the filter cloth 53. It is to be noted that a sewing of the filtrate collecting member 52 with the filter cloth 53 differentiates the dimension of the mesh of the filter cloth 53 at the portion where it is sewn, from the dimension of the mesh of other portions, in which case, filtering efficiency is reduced, however, such efficiency reduction can be avoided by sewing the raw liquid feed hole 53a of the filter cloth with the through hole 52a of the raw liquid collecting member 52 as described above. Such a sewing does not make the dimension of the mesh uniform throughout the filter cloth 53, and filtering efficiency is not reduced. It is preferable that a hard material is used for the filtrate collecting member 52. The member 52 can be positioned vertically in the frame 1 by supporting the peripheral edge of the through hole 52a without supporting the upper portion of the member 52. Material for the filtrate collecting member 52 can be selected from light natural material, synthetic resin, metal and the like. The member 52 can be formed so as to have openings of suitable mesh size when synthetic resin or metal is used as the material therefor. The configuration of the raw liquid collecting member 52 shown in the drawings is square in the front view, however, the configuration of the member 52 is arbitrary, e.g., circular or triangular. A certain space is formed between the outer peripheral edge of the filtrate collecting member 52 and the inner face 1p of the frame 1.

Figure 30:
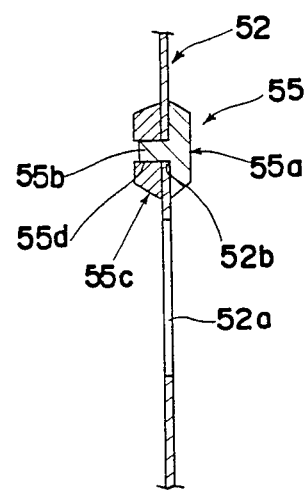
FIG. 30 is a sectional side elevational view of the filtrate collecting member shown in FIG. 29.

As shown in FIGS. 29 and 30, the raw liquid collecting member 52 is provided with a space maintaining member 55 above the through hole 52a so as to maintain a certain space between the filter cloths 53 and 53, which allows filtrate to be introduced to the frame 1 easily. A fitting 55b of one part 55a of the member 55 is inserted through a hole 52b of the filtrate collecting member 52 and fitted in a hole 55d of another part 55c of the member 55. Thus, the space maintaining member 55 is mounted on the filtrate collecting member 52.

A filtration process according to the above-described construction is as follows: A plurality of filter plates 2, ..., 2 positioned between the front stand 30 and the rear stand 31 (refer to FIG. 1) are supported by the side beams 12 and 12 provided, between both stands 30 and 31, at both sides of the filter press so that the filter plates 2, ..., 2 can be moved forward and backward. The movable plate 36 is advanced to clamp the filter plates 2, ..., 2 at a place where the front stand 30 stops. Thereafter, raw liquid under pressure is introduced from the raw liquid feed hole 53a, formed on the filter cloth 53 disposed between the filter plates, to the filter chamber 13 formed between a pair of the confronting filter cloths 53 and 53 so as to separate the filter residue 14 from filtrate after filtering the raw liquid by the filter cloths 53. The filter residue 14 is maintained in the filter chamber 13 located between a pair of filter cloths 53 and 53, while the filtrate passes through the filter cloths 53 into the frame 1. Thereafter, the filtrate collecting member 52 guides the filtrate downward in the frame 1, and then, the filtrate flows through the communicating hole 1c into the filtrate collecting hole 1a so as to be collected.

As described in the third embodiment, a filtrate drainage guide member is not formed in the frame 1 of the filter plate, but a cloth which serves as a filtrate collecting member 52 is supported by hanging from the filter cloth 53. Therefore, a filter press according to this embodiment can be lighter than a conventional one in which a filtrate drainage guide member is provided. Further, since the filtrate collecting member 52 is supported in the frame between the filter cloths 53 and 53, filtrate which has passed through the filter cloth 53 into the frame 1 can be reliably collected by allowing the filtrate to flow through the filtrate collecting member 52 to the lower portion of the frame 1, hence the filtrate is smoothly collected. In addition, the filtrate collecting member 52 is so supported that the filter cloth 53 can move in unison with the member 52. Therefore, if there arises a large filtration pressure difference between both sides of the filtrate collecting member 52, the filtration pressure difference can be absorbed by moving the member 52, so that the member 52 is not damaged. Meanwhile it is to be noted that in a conventional filter plate in which a filtrate drainage guide member is provided, if a large filtration pressure difference is generated, the filtrate drainage guide member is damaged because the filtrate drainage guide member is rigid. In addition to the above advantage of the invention, since the filtrate collecting member 52 made of a cloth undergoes an elastic deformation, it can absorb a filtration pressure difference.

Figure 31:
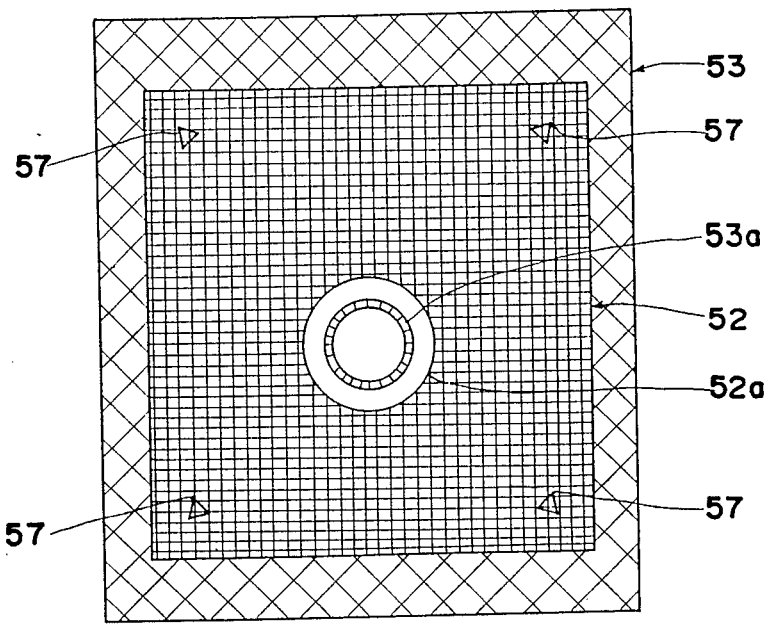
FIG. 31 is a front view of a filter cloth on which a filtrate collecting member according to a modification of the third embodiment is mounted.
Figure 32:
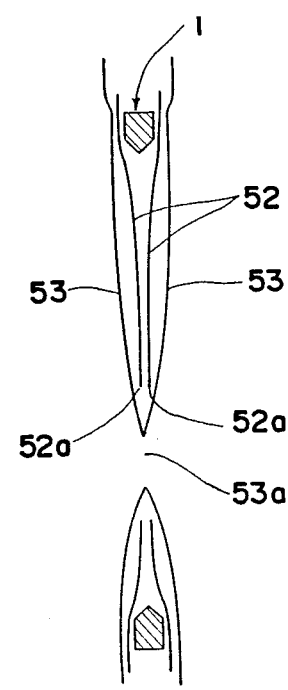
FIG. 32 is a sectional side elevational view of the filter plate on which are mounted the filtrate collecting member and the filter cloth shown in FIG. 31.
Figure 35:
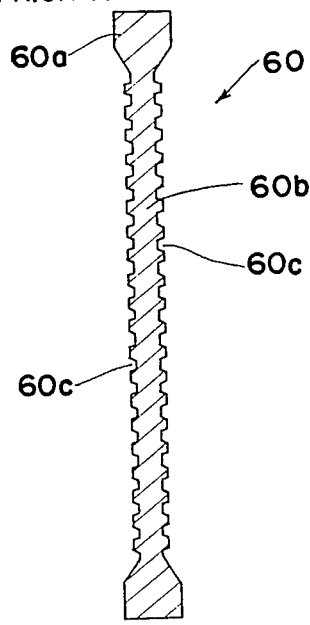
FIG. 35 is a sectional side elevational view of a conventional filter plate, as previously described.

The third embodiment is not limited to the above-described construction, but many modifications are possible. For example, the thickness of the filtrate collecting member 52 may be selected as desired. The configuration of the member is not restricted to the one, shown in FIG. 26, in which a certain space is provided between the inner face 1p of the frame 1 and the peripheral edge of the filtrate collecting member 52. The member 52 can be so wide as to reach the inner face 1p of the frame 1 as shown in FIG. 31 and it can be so great as to spread beyond the inner face 1p of the frame body 1. The member 52 can be constructed using more than two sheets as shown in FIG. 32 which is a cross-sectional view of the embodiment shown in FIG. 31. The provision of a plurality of members 52 allows an easy generation of clearance between the confronting filter cloths in the space 1e in the frame 1, so that filtrate can be collected more easily. The member 52 may be mounted on the filter cloth 53 at desired points such as shown in FIG. 31, wherein the member 52 is sewn at four corners of the filter cloth 53. The member 52 may be mounted on the filter cloth 53 by sewing the member 52 to a cloth sewn on the filter cloth 53. The member 52 in which an elastic material is used can correct a filtration pressure difference which is generated between both faces of the member 52. Even a solid body used as the material for the member 52 can correct a pressure difference generated between both sides of the member 52 if the solid body is movably mounted on the filter cloth 53 or the frame 1. A sheet having no mesh to allow filtrate to pass therethrough can also be used as a material for the member 52.

Figure 33:
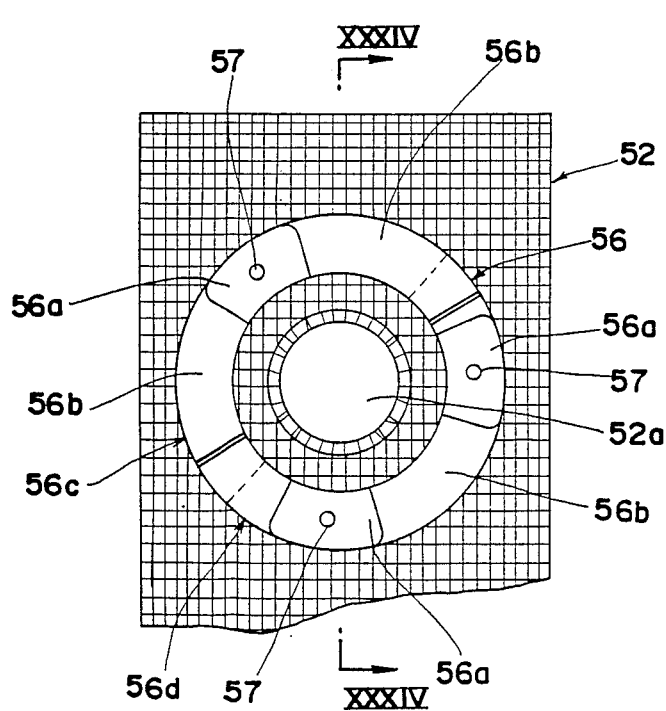
FIG. 33 is a front view in which a space maintaining member of another modification of the third embodiment is mounted on a filtrate collecting member.
Figure 34:
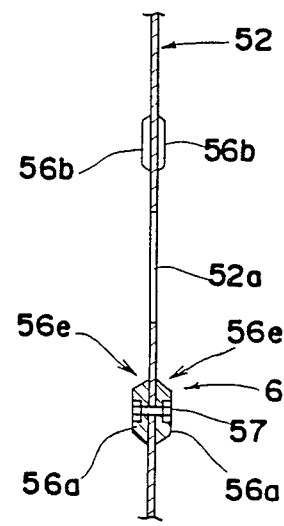
FIG. 34 is a sectional side elevational view taken along a line XXXIV—XXXIV in FIG. 33.

The space maintaining member 55 may be omitted depending on the quality of the material, property of a raw liquid, and the like. The member 55 may be formed in an arbitrary configuration and the number of members can be selected and positioned as desired. As shown in FIGS. 33 and 34, the member 55 may be mounted on the filtrate collecting member 52 by means of bolts 57, ..., 57 after a pair of circular plates 56e and 56e are disposed at the circumference of the through hole 52a of the filtrate collecting member 52. The plates 56e comprise C-shaped plates 56c and 56d. A raw liquid feed concave portion 56b and an abutting convex portion 56a are alternately formed on the surface of the plates 56c and 56d. When a plurality of frames 1, ..., 1 are clamped by a movable plate at a position near one of the two stands. The convex portions 56a of the space maintaining member 56 are brought into contact with each other and the pair of concave portions 56b and 56b confront each other so as to form a space, so that a raw liquid is fed from the space into the filter chamber 13.

As shown in FIG. 26, the frame 1 may be covered with a large filter cloth 53 so as to cover the front and rear faces of the frame 1. The filter cloth 53 may be supported by hanging it from members (refer to FIG. 11) other than the frame 1. The place where the raw liquid feed hole 53a provided on the filter cloth is disposed is not limited to a filtering face in the frame, but it may be a so-called top feed type or bottom feed type in which a raw liquid feed hole is disposed outside a filtering face.

The configuration of the frame 1 is not limited to being square, but rather may be circular or any shape as desired.

In the above-described embodiments and modifications, a filter cloth is used as a supporting means, however, it is possible to use other supporting means such as an elastic string so as to movably support a filtrate drainage guide means in the frame 1. In the embodiments and their modifications, like parts are designated by like numerals for the sake of brevity.

All of the embodiments and their modifications described above can fully attain the object of the invention.

While the invention has been described with reference to the foregoing embodiments, it will be apparent that many changes and modifications may be made thereto which fall within the scope of the appended claims.

What is claimed is:

1. A filter press having a plurality of filter plates (2); a plurality of pairs of filter cloths (5, 27, 40, 48a, 53) each pair being between an adjacent pair of the plates; clamping means (36, 29) for clamping the filter plates in a direction in which the plates are arranged, wherein after a plurality of the filter plates (2) are clamped and a raw liquid is introduced between each pair of the filter cloths (5, 27, 40, 48a, 53) so as to filter the raw liquid and a filtrate passes through the filter cloths (5, 27, 40, 48a, 53) and flows downward along the filter plates (2), and filter residue (14) is maintained between each pair of the filter cloths (5, 27, 40, 48a, 53), each of the filter plates including a frame (1) forming a closed loop with an inner periphery of said loop forming a through hole penetrating front and back surfaces of said frame so as to define an empty space; flat filtrate drainage guide means (3, 41, 52); and supporting means (5, 5d, 40, 48, 53) comprising said filter cloths for movably supporting said filtrate drainage guide means (3, 41, 52) so as to be hung within said space in said frame (1) such that an outer periphery of said filtrate drainage guide means is within said inner periphery of said loop and said filtrate drainage guide means is movable within said space towards and away from said inner periphery of said loop.

2. A filter press as claimed in claim 1, wherein each filtrate drainage guide means (3, 41, 52) is supported by a pair of filter cloths (5, 27, 40, 48a, 53) disposed at both sides of each filter plate (2).

3. A filter press as claimed in claim 2, wherein a pair of filter cloths (5) which sandwich said frame (1) have a raw liquid feed hole (5a) at a portion where said filter cloths confront each other, a cylindrical raw liquid-feed communicating portion (5b) connects the confronting raw liquid holes (5a, 5a), and said filtrate drainage guide means (3) is supported by said communicating portion (5b).

4. A filter press as claimed claim 2, wherein said pair of filter cloths (40, 53) which sandwich said frame (1) have raw liquid feed holes (40a, 53) at confronting portions in said frame (1) and the circumference edges of confronting raw liquid feed holes (40a, 53a, 40a, 53a) are sewn to each other and said filtrate drainage guide means (41, 52) are supported by the portions where said raw liquid feed holes are sewn to each other.

5. A filter press as claimed in claim 2, wherein said filter cloths (48a) each have a raw liquid feed hole (48b) at confronting portions thereof, a cylindrical raw liquid feed plate having a central opening therein (49) is interposed between the pair of filter cloths (48a) located between the adjacent pairs of filter plates and attached to a respective one of said filter cloths with the opening of said feed plate in fluid communication with a respective said raw liquid feed hole (48b), and said filtrate drainage guide means (41) is supported by said raw liquid feed plate (49).

6. A filter press as claimed in claim 1, wherein said filtrate drainage guide means is supported from said frame (1) by filter cloth vibrating means (10, 21).

7. A filter press as claimed in claim 1, wherein said filtrate drainage guide means (3, 41, 52) comprises plate-shaped members.

8. A filter press as claimed in claim 7, wherein said filtrate drainage guide means (52) is composed of an elastic material.

9. A filter press as claimed in claim 8, wherein said filtrate drainage guide means (52) is composed of a cloth.

10. A filter press as claimed in claim 8, wherein said filtrate drainage guide means is composed of a net material.

11. A filter press as claimed in claim 8, wherein said filtrate drainage guide means (52) includes a space maintaining member (55) which forms a space between said filtrate drainage guide means (52) and the filter cloths (53).

12. A filter pressure as claimed in claim 1, wherein both sides of said filter plates (2) are, respectively, covered with corresponding compressing diaphragms (43).

13. A filter press as claimed in claim 12, wherein said filtrate drainage guide means (41) is supported by hanging from a pair of the compressing diaphragms (42, 43) which cover confronting filter cloths.

14. A filter press as claimed in claim 12, wherein said compressing diaphragms (43, 43) have, respectively, raw liquid feed holes (43a, 43a) and the circumference edges of said raw liquid feed holes (43a, 43a) are connected to each other to form a connecting portion, and said filtrate drainage guide means (41) is supported by hanging from said connecting portion of said compressing diaphragms.

15. A filter press having a plurality of filter plates (2); a plurality of pairs of filter cloths (5, 27, 40, 48a, 53), each pair being between an adjacent pair of the plates; clamping means (36, 29) for clamping the filter plates in a direction in which the plates are arranged, wherein after a plurality of the filter plates (2) are clamped and a raw liquid is introduced between each pair of the filter cloths (5, 27, 40, 48a, 53) so as to filter the raw liquid and a filtrate passes through the filter cloths (5, 27, 40, 48a, 53) and flows downward along the filter plates (2), and filter residue (14) is maintained between each pair of the filter cloths (5, 27, 40, 48a, 53), each of the filter plates including a frame (1) forming a closed loop with an inner periphery of the loop defining a space; flat filtrate drainage guide means (3, 41, 52); and supporting means (5, 5d, 40, 48, 53) for movably supporting said filtrate drainage guide means (3, 41, 52) within said space in said frame (1), said filtrate drainage guide means (3, 41, 52) being composed of plate-shaped members, said filtrate drainage guide means (41) comprising an annular inner plate (41a), an annular outer plate (41b) and connecting members (41c) for connecting said outer and inner plates (41a, 41b), and a space (S1) is formed between the outer face of said outer plate (41a) and the inner face of said frame (1), and a space (S2) is formed between said outer plate (41a) and said inner plate (41b).

16. A filter press having a plurality of filter plates (2); a plurality of pairs of filter cloths (4, 27, 40, 48a, 53), each pair being between an adjacent pair of the plates; clamping means (36, 29) for clamping the filter plates in a direction in which the plates are arranged, wherein after a plurality of the filter plates (2) are clamped and a raw liquid is introduced between each pair of the filter cloths (5, 27, 40, 48a, 53) so as to filter the raw liquid and a filtrate passes through the filter cloths (5, 27, 40, 48a, 53) and flows downward along the filter plates (2), and filter residue (14) is maintained between each pair of the filter cloths (5, 27, 40, 48a, 53), each of the filter plates including a frame (1) forming a closed loop with an inner periphery of the loop defining a space; flat filtrate drainage guide means (3, 41, 53); and supporting means (5, 5d, 40, 48, 53) for movably supporting said filtrate drainage guide means (3, 41, 53) within said space in said frame (1), said filtrate drainage guide means (3, 41, 52) being composed of plate-shaped members, said pair of filter cloths (48a) which sandwich said frame (1) having, respectively, raw liquid feed holes (48b) which confront each other in said frame (1), and a cylindrical raw liquid feed plate (49) is mounted on said filter cloths (48a) at said raw liquid feed hole (48b) and said filtrate drainage guide means (41) comprises a frame portion (411) and a connecting spring portion (41m), which connects an inner face of the frame portion (411) to said raw liquid feed plate (49) and a space (S3) is formed between an outer face of said frame portion (411) and the inner periphery of said loop comprising said frame body (1), and a space (S4) is formed between said frame (411) and said raw liquid feed plate (49).

17. A filter press plate comprising:
a frame forming a closed loop with an inner periphery of the loop forming a through hole penetrating front and back surfaces of the frame so as to define an empty space; flat filtrate drainage guide means supported by a pair of filter cloths disposed at both sides of said filter plate; and supporting means comprising said filter cloths for movably supporting said filtrate drainage guide means so as to be hung within said space in said frame such that an outer periphery of said filtrate drainage guide means is within said periphery of said loop and said filtrate drainage guide means is movable within said space towards and away from said inner periphery of said loop.

18. A filter press plate as claimed in claim 17, wherein said filter cloths each have a raw liquid feed hole at confronting portions thereof, said supporing means comprises a cylindrical raw liquid feed plate having a central opening therein mounted on a respective one of said filter cloths with the opening of said feed plate in fluid communication with said raw liquid feed hole, and said filtrate drainage guide means is supported by said raw liquid feed plate.

19. A filter press plate as claimed in claim 17, wherein said filtrate drainage guide means is composed of a cloth.

20. A filter press plate as claimed in claim 17, wherein said filtrate drainage guide means is composed of a net material.

21. A filter press plate as claimed in claim 17, wherein said filtrate drainage guide means includes a space maintaining member which forms a gap between said filtrate drainage guide means and the filter cloths.

22. A filter press plate as claimed in claim 17, wherein said front and back surfaces of said filter plate are, respectively, covered with a corresponding compressing diaphragm.

23. A filter press plate comprising:
a frame forming a closed loop with an inner periphery of the loop defining an empty space; a pair of filter cloths, each of which is on one side of said frame; flat filtrate drainage guide means supported from said frame by filter cloth vibrating means attached to said filter cloths; and supporting means comprising said filter cloths for movably supporting said filtrate drainage guide means within said space in said frame.

* * * * *